United States Patent [19]

Kramer et al.

[11] 4,416,165

[45] Nov. 22, 1983

[54] STEPPING GEAR

[75] Inventors: Klaus Kramer, Bad Bramstedt; Rolf Huss, Hamburg, both of Fed. Rep. of Germany

[73] Assignee: Focke and Company, Verden, Fed. Rep. of Germany

[21] Appl. No.: 350,927

[22] Filed: Dec. 29, 1981

Related U.S. Application Data

[63] Continuation of Ser. No. 116,417, Jan. 29, 1980, abandoned.

[30] Foreign Application Priority Data

Feb. 1, 1979 [DE] Fed. Rep. of Germany ....... 2903732

[51] Int. Cl.³ .................... F16H 25/16; F16H 53/00
[52] U.S. Cl. .................................. 74/70; 74/436; 74/567; 74/820
[58] Field of Search ............... 74/84, 122, 426, 436, 74/567, 813 R, 816, 817, 820, 827, 70

[56] References Cited

U.S. PATENT DOCUMENTS

| | | | |
|---|---|---|---|
| 2,560,686 | 7/1951 | Curtis | 74/820 |
| 2,986,949 | 6/1961 | Lancaster et al. | 74/567 |
| 3,170,333 | 2/1965 | Umbricht | 74/567 |
| 3,590,661 | 7/1971 | Chaveneaud | 74/436 |
| 4,109,548 | 8/1978 | Shinohara et al. | 74/817 |

*Primary Examiner*—Kenneth Dorner
*Attorney, Agent, or Firm*—Sughrue, Mion, Zinn, Macpeak and Seas

[57] ABSTRACT

A stepping gear includes an output member attached to a wheel which is provided with a number of rollers on both faces thereof. In driving contact with these rollers is a pair of cam members having contours which allow for driving in the forward direction as well as a standstill or dwell phase. In addition, reverse movement of the wheel is made possible by providing an undercut in one of the cams coupled with a superelevation on the other of the two cams. Form locking engagement between the cams and the rollers is maintained during the forward driving phase, and the standstill and return phases as well.

7 Claims, 9 Drawing Figures

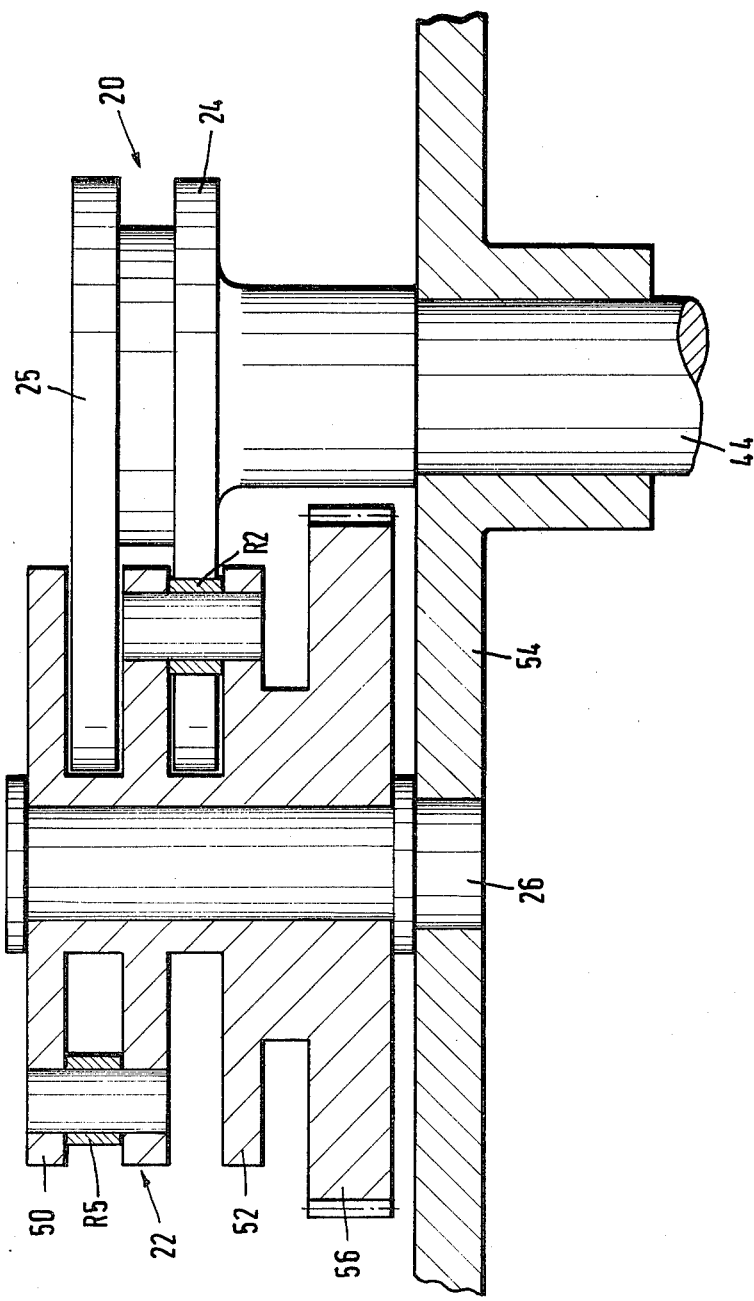

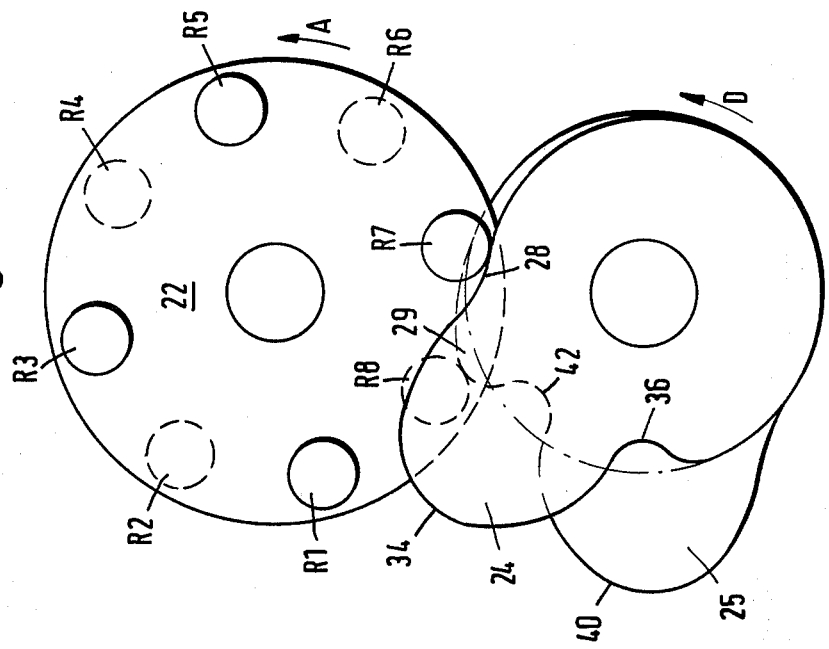
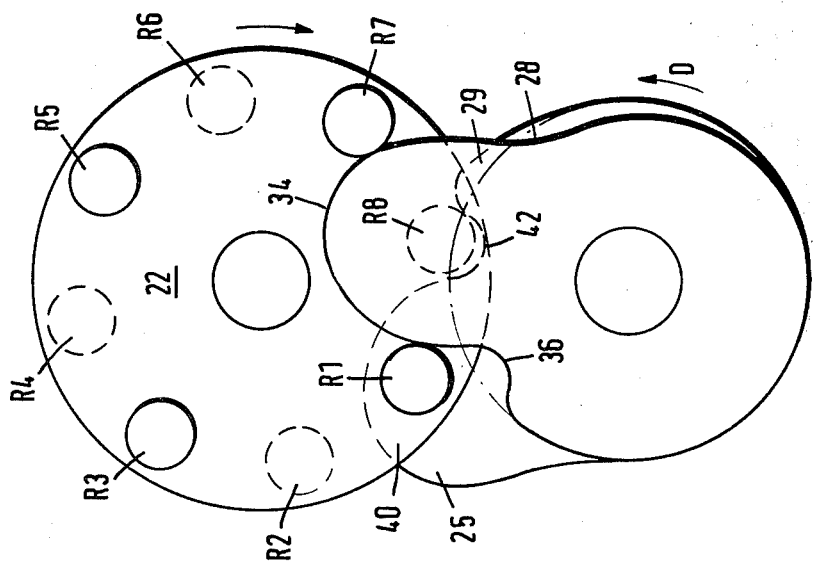

STEPPING GEAR

This is a continuation of application Ser. No. 116,417, filed Jan. 29, 1980, and now abandoned.

The present invention relates to a stepping gear with at least one wheel connected to an output member with rollers or followers arranged on both sides and cooperating alternately with two disc cams of a driver. Such gears are used preferably in the packaging industry for driving turntables with packaging supports etc. However the gears of known construction are not suitable for discontinuously operating packaging machines on which e.g., it is necessary for a transport rake to be retracted sufficiently to enable the packages to be wrapped to be rotated. The reason is that the known gears do not exhibit a return phase with a continuous drive of the driver and of the driver cams.

It is therefore the underlying aim of the present invention to develop the gear initially defined, which has been widely successful owing to its simple construction and robustness, in such a way that a return phase or a so-called step-back effect is obtainable.

This aim is achieved in that one disc cam is provided with an undercut causing a return movement of the wheel connected to the output member, either following the forward movement or during the standstill phase, whereas the other disc cam exhibits a superelevation so that the movement cycle of the output member comprises a standstill phase, movement phase and return phase. Form-locking engagement exists permanently between the disc cams and the rollers, i.e. both in the standstill and movement phases and also in the return phase.

The solution according to the invention constitutes a structurally extremely simple and therefore reliable gear, which simultaneously presents the advantage that a return movement is present. During a study of the movement cycle it was discovered that elasticities in the work elements following the gear cause an additional return movement when said elasticities are released. In order to obviate said return movements, which are generally uncontrolled, it is proposed according to the invention to have constant form-locking engagement between the disc cams and the rollers—i.e. both in the standstill, movement and also in the return phase. The disc cams are therefore braced in both directions at all times.

In this manner the use of freewheels, ratchets, magnetic brakes etc., to prevent an uncontrolled return movement of the wheel connected to the output member is obviated.

Due to the form-locking mutual engagement of the rollers and disc cams in every movement phase, an absolutely controlled movement cycle including controlled return of the gear is established.

Attention is further drawn to the fact that a stepping gear provided without driver rollers permits the advantage, when compared to a stepping gear with a star disc or star wheel as an output member and with a driver with driver rollers co-operating directly with the star wheel, that no star wheel with a star cam is required, no entangling of the roller centre orbits exists, control of the interval between the contour edge of the star cam and the driver roller centre is unnecessary, large step-back angels can be achieved and form-locking engagement is ensured even for a step angle of 90°.

A particularly advantageous embodiment of the present invention is described more fully herein below with reference to the accompanying drawings.

In the drawings:

FIG. 2 shows the gear according to FIG. 1 along the line II—II,

Figure 7:
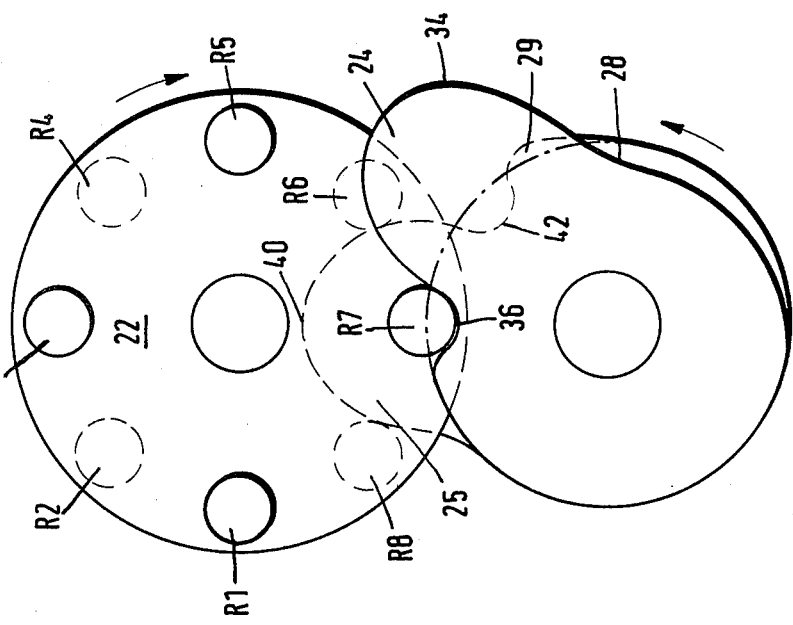
Figure 8:
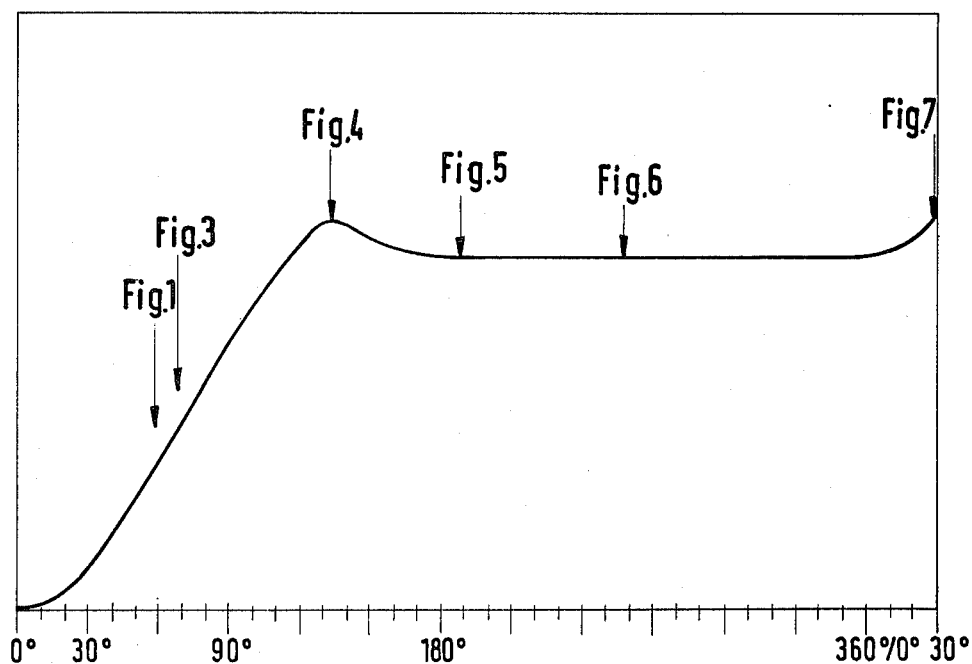
Figure 9:
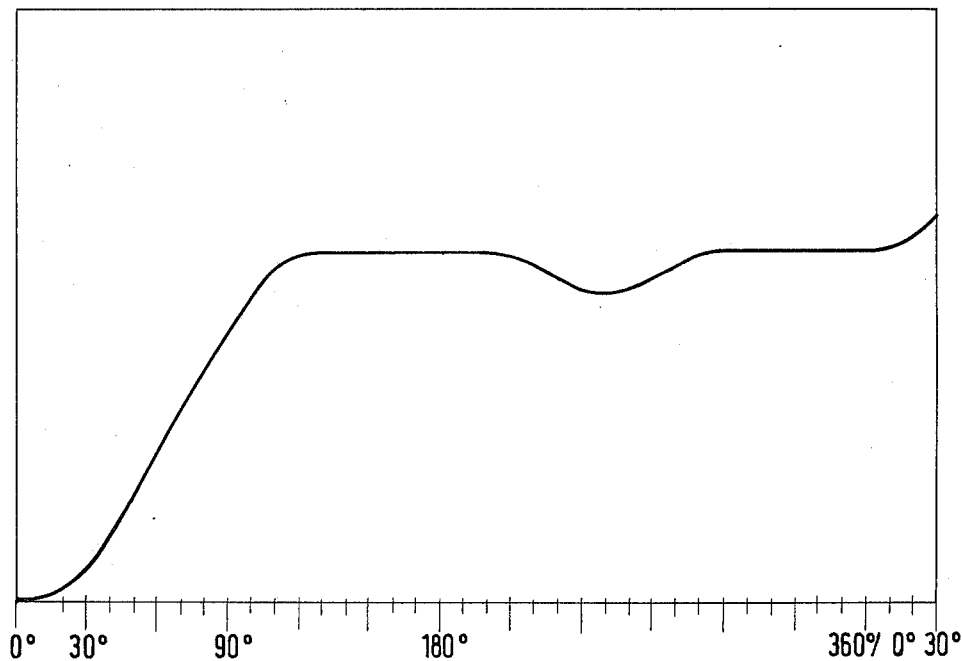

FIGS. 3 to 7 show the engagement between the two disc cams and the cam rollers or followers between two consecutive standstill phases of the gear, FIG. 8 shows a graph of the movement cycle of the output member, wherein the return phase occurs following the forward movement, and FIG. 9 shows a graph of a movement cycle with negative oscillating movement of the output member during the standstill phase.

Figure 1:
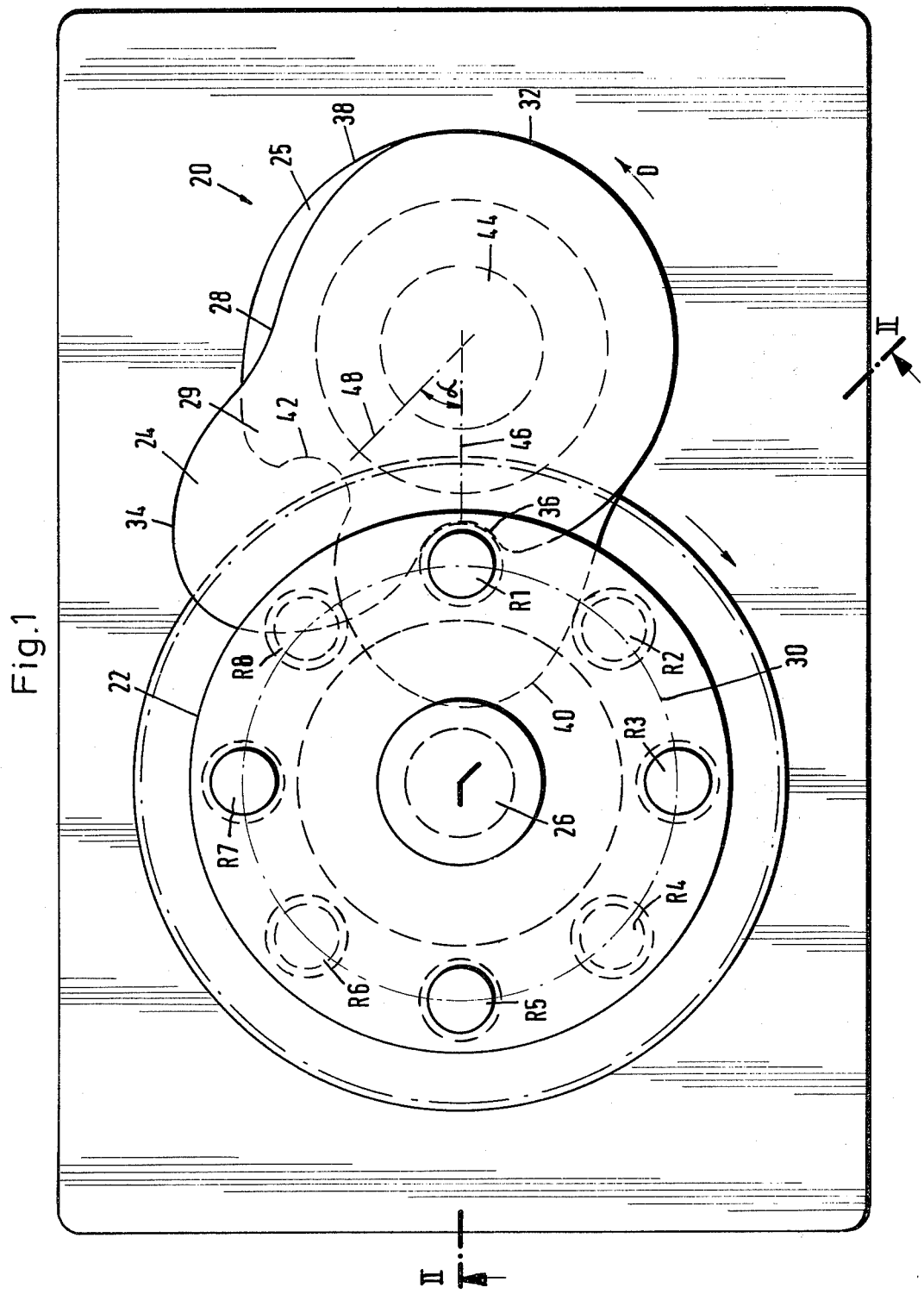
FIG. 1 shows an exemplary embodiment of the gear according to the invention in side elevation.

The stepping gear according to FIGS. 1 and 2 includes a driver 20 with two disc cams 24, 25, which co-operate alternately with rollers or followers R1 to R8 which are mounted in two parallel planes between opposed roller wheels 22, 50, 52 mounted freely rotatably on a staybolt 26. An output gear wheel 56 is provided integrally with the wheels 22, 50, 52. The staybolt 26 is mounted in the housing 54 of the gear. The driver shaft 44 of the driver 20 is mounted rotatably in the housing 54 of the gear. As may be seen clearly from FIGS. 1 and 2, four rollers are distributed uniformly along a common imaginary circular circumference 30, on each side of the central wheel 22, the rollers arranged on the one side being provided with the reference numerals R1, R3, R5, R7 and the rollers arranged on the opposite side of the wheel 22 with the reference numerals R2, R4, R6, R8. The second quartet of rollers R2, R4, R6, R8 lie on the bisectors of the angles of the first quartet of rollers R1, R3, R5, R7; the eight rollers R1 to R8 are therefore arranged uniformly distributed on the imaginary circular circumference 30.

The first disc cam 24 exhibits an approximately semicircular catch section 32, a cam section 34 projecting lug-fashion, and a trough-shaped indentation or groove 36 in the region of the one transition between catch and cam sections, and an undercut 28 in the region of the other opposite transition. The undercut 28 is generated by a steady reduction in the radius of the catch circle 32 in the region of the last mentioned transition between the cam and catch sections. The external contour of the first disc cam 24 is therefore drawn inwards towards the driver axis 44 in the said region. The second disc cam 25 likewise exhibits an approximately semicircular catch section 38, a cam section 40 projecting lug-fashion, and a trough shaped indentation or groove 42 in the region of the one transition between cam and catch section. As FIG. 1 clearly shows, the second disc cam exhibits no undercut in the region of the transition between the cam and catch section opposite the indentation or groove 42. However, the second disc cam 25 exhibits a superelevation 29 following the groove 42 in the region between the groove 42 and the catch section 38. In this way form-locking engagement between the disc cams 24, 25 and the rollers R1 to R8 is ensured at all times during the entire movement cycle. The radius of the two indentations 36 and 42 corresponds to the radii of the rollers R1 to R8.

The two flanks or contours of the cam sections 34, 40 are constituted by two mutually intersecting curve branches. The flat point thereby produced may be of rounded construction—as in the exemplary embodiment according to FIGS. 1 and 3 to 7. However, the degree of rounding is limited by the condition that form-locking engagement must exist between driver and output member at all times—i.e. in all relative positions between driver and output member.

The two disc cams 24 and 25 are arranged on the driver shaft 44 so that the two cams 34, 40 enclose an acute angle between them and such that the indentation or groove 36 or 42 of the one disc cam 24 or 25 lies respectively upon the center lines 46 or 48 of the other disc cam 25 or 24. The first disc cam 24 co-operates with the rollers or followers R1, R3, R5, R7, and the second disc cam 25 with the rollers or followers R2, R4, R6, R8. As may be seen from FIG. 2, the driver 20 is constructed integrally with the two disc cams 24, 25.

In FIG. 1 the gear occupies the so-called passage position of the roller or follower R1, in which the two gear axis points lie in one line with the roller R1. In this position three rollers, namely the rollers R1, R2 and R8, are in engagement with the two disc cams 24, 25.

The mutual engagement between the two disc cams 24, 25 and the rollers R1 to R8 is explained in detail hereinbelow with reference to FIGS. 3 to 7. The FIGS. 3 to 7 are a simplified representation of the gear according to FIG. 1, in which D designates the direction of rotation of the disc cams 24, 25 serving as drivers.

In FIG. 3 the rollers R1 and R7 are in engagement with the cam section 34 of the first disc cam 24. The roller R8 dips into the indentation 42 of the second disc cam 25. FIG. 3 shows the position of the gear just before the passage position of the roller R8 and after the passage position of the roller R1 according to FIG. 1.

In FIG. 4 the two disc cams 24, 25 have rotated so far in the direction of rotation D that the roller R1 is out of engagement. Form-locking engagement exists between the disc cam 25 and the roller R8 in the region of the superelevation 29 and between the disc cam 24 and the roller R7 in the region of the undercut 28. In the position shown the return phase of the wheel 22 is just commencing. This is indicated by the arrow A in FIG. 4. The return of the wheel 22 in fact commences when the roller R7 has travelled through the lowest position of the undercut 28 and the roller R8 has attained the highest point of the superelevation 29. As clearly shown in FIG. 4, form-locking engagement between the driver and the wheel 22 connected to the output member therefore exists even during the return phase.

Figure 5:
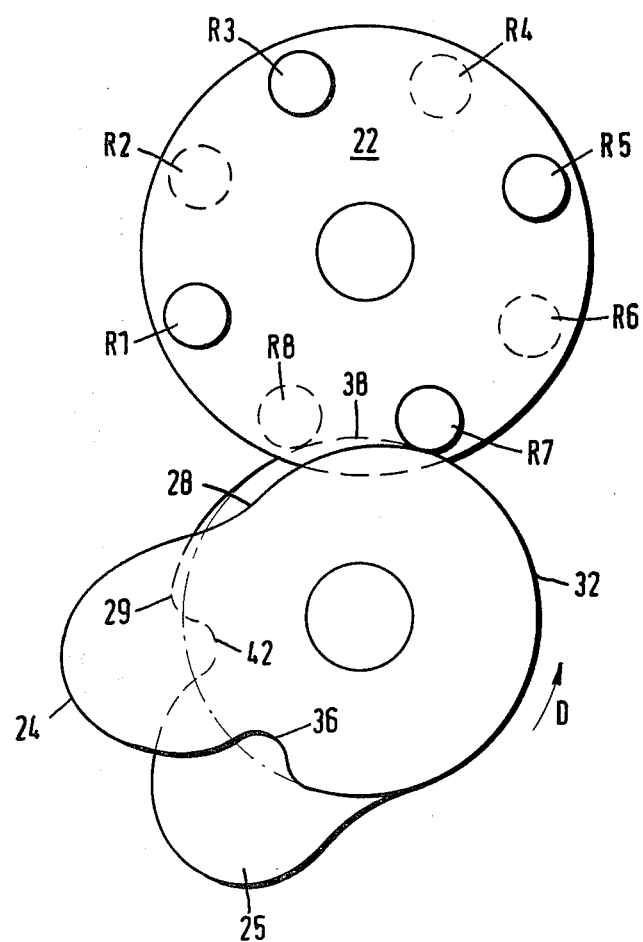

FIG. 5 shows the position after the return is complete. The rollers R8 and R7 are located on the two catch sections or catch circles 32, 38 of the disc cams 24, 25. The standstill phase of the wheel 22 now commences.

Figure 6:
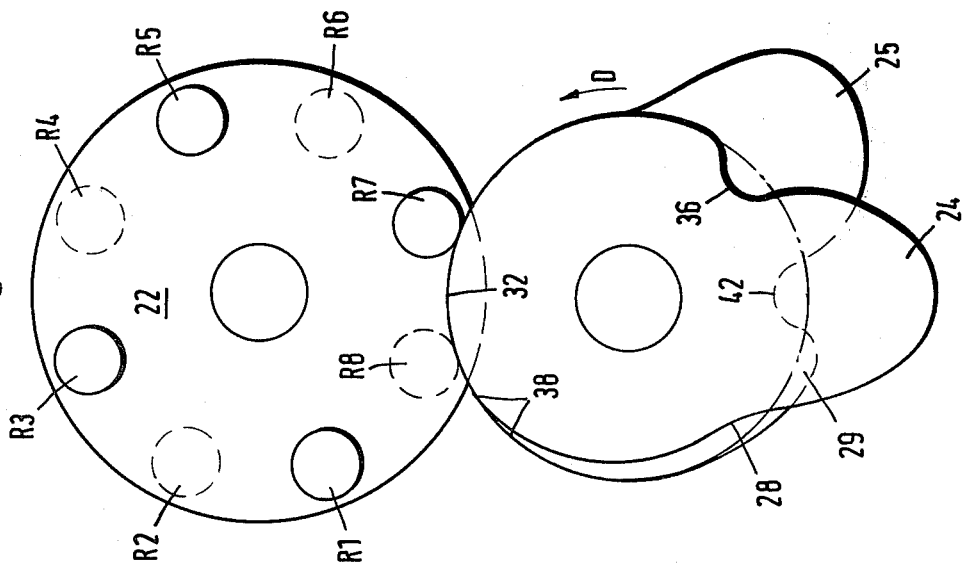

In FIG. 6 the wheel 22 is still in the standstill phase. As FIGS. 5 and 6 show, form-locking engagement between the two disc cams 24, 25 and the rollers of the wheel 22, the rollers R8 and R7 in FIGS. 5 and 6, exists at all times even at the commencement of and during the standstill phase.

FIG. 7 illustrates the passage position of the roller R7. The rollers R8 and R6 abutting the cam section 40 of the second disc cam 25 preferably absorb all forces. The roller R7 is thereby supported. Which rollers actually absorb the forces naturally depends upon the tolerances. The roller R7 could likewise absorb all forces. The security against accidental rotation is however improved if at least one further roller is in contact with the contours of the disc cams.

The position according to FIG. 7 corresponds to the position according to FIG. 1, with the one difference that the disc cams 24, 25 have been rotated 360° in the direction of rotation D, and the wheel 22 through 90°.

The special feature of the gear according to the invention lies in the dipping of one of the rollers in engagement in each case beneath the catch circle of the associated driver cam and the following return of the roller onto said catch circle in the sense of a step-back movement. A co-ordinated superelevation of the second driver cam 25 corresponds to the undercut of the said driver cam 24. By this means form-locking engagement between the driver cams and rollers of the output wheel is ensured in all movement phases including the return phase.

The form-locking step-back phase of the output member occurs following the forward movement in the exemplary embodiment. For the movement cycle of this gear attention is drawn to FIG. 8, in which the phases illustrated in FIGS. 1, 3–7 are marked in the appropriate positions.

A negative oscillating movement of the output member during the standstill phase is illustrated in FIG. 9. The standstill of the output member and of the wheel connected to the output member is interrupted by a return and forward movement (negative oscillating movement). An interruption by a forward and return movement would likewise be conceivable. This movement phase is then called a positive oscillating movement. Such oscillating movements can be combined with the step-back phase according to FIG. 8, if a corresponding movement cycle is required.

The oscillating movements in the standstill phase can be achieved by design by the construction of undercuts and superelevations on the catch sections of the disc cams.

The so-called bracing wheels 50, 52 illustrated in FIG. 2 may possibly be unnecessary for smaller gear constructions. In such cases the rollers R1 to R8 arranged on both sides of the wheel 22 are each mounted floating.

It is also pointed out that a stepping angle of 90° is obtainable in the exemplary embodiment described. If six rollers instead of four rollers are arranged on each side of the wheel, namely preferably again distributed uniformly round a common imaginary circular circumference, then a stepping angle of 60° is obtained. The arrangement of six rollers on each side of the wheel naturally necessitates a corresponding adaptation of the disc cams 24 and 25.

Finally attention is drawn to the fact that the rollers on the one side of the wheel need not necessarily lie on the bisectors of the angles between the rollers of the other side of the wheel.

We claim:

1. A stepping gear mechanism, comprising: an output member, at least one wheel connected to said output member, said wheel being provided with rollers alternatingly arranged on both sides thereof, driving means comprising two disc cams rotationally secured to an input, said disc cams being engaged with said rollers in form locking engagement at all times, said cam discs rotating in one direction and normally causing either no wheel rotation or wheel rotation in a first, forward direction, but wherein a first one of said disc cam includes means for causing reverse movement of said wheel comprising an undercut formed in a roller engaging surface thereof, the second of said disc cams including a zone of increased cam radius circumferentially offset from the location of said undercut.

2. A stepping gear according to claim 1, wherein an even number of said rollers are arranged along an imaginary circular circumference on each side of the wheel, the number and position of the rollers on each side of the wheel mutually determining the overall size and a stepping angle thereof.

3. A stepping gear according to claim 2, wherein four rollers are arranged along an imaginary circular circumference on each side of the wheel.

4. A stepping gear according to claim 3, wherein a first set of four rollers are arranged uniformly distributed along a common imaginary circular circumference on one side of the wheel, while a second set of four rollers are arranged on the bisectors of the angles of the first quartet of rollers, and on the opposite side of said wheel.

5. A stepping gear according to claim 4, wherein the first disc cam includes an approximately semicircular catch section, a projecting cam section, a trough-shaped indention in the region of a first transition between said catch section and said cam section and said undercut in the region of a second such transition, and wherein the second disc cam includes an approximately semicircular catch section, a cam section, a trough-shaped indention in the region of the first transition between cam and catch sections, and said zone of increased cam radius in the region between the indention thereof and the undercut of the first disc cam, said zone of increased cam radius maintaining said form locking engagement during said reverse movement of said wheel.

6. A stepping gear according to claim 5, each of said two disc cams having a center line extending between a center of rotation of the disc cam and a peripheral point at a greater radius of the disc cam, wherein the two disc cams are located on a driver shaft such that the two cams together enclose an acute angle and such that the indentation of one disc cam is bisected by a plane containing the center of rotation and the center line of the other disc cam.

7. A stepping gear according to claim 1, further comprising bracing discs arranged on either side of said wheel for assisting in mounting said rollers to said wheel.

* * * * *